Figure 4:
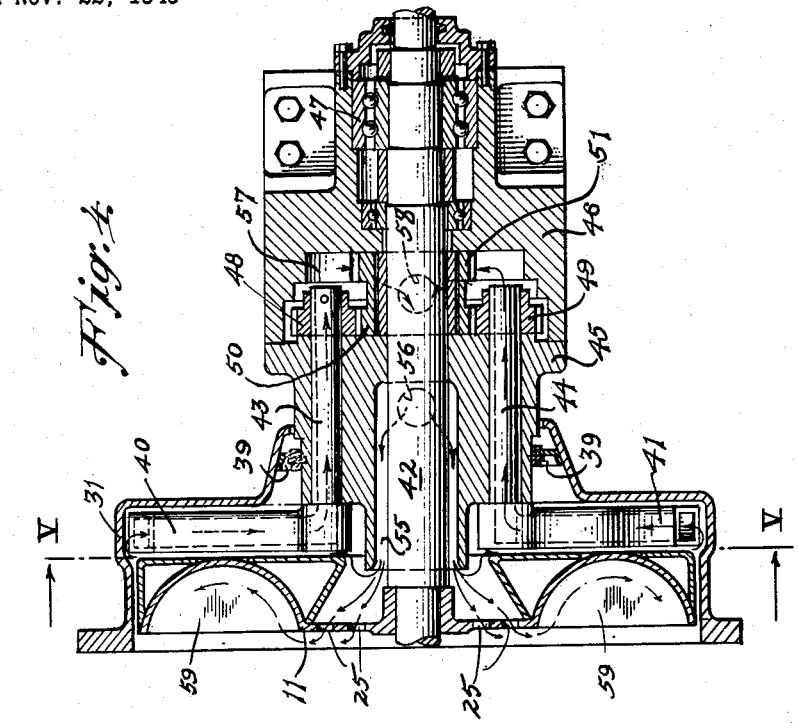

Sept. 28, 1954　　　　　C. A. ODING　　　　　2,690,052
VARIABLE SPEED POWER TRANSMITTING FLUID COUPLING
Filed Nov. 22, 1949　　　　　　　　　　　3 Sheets-Sheet 1
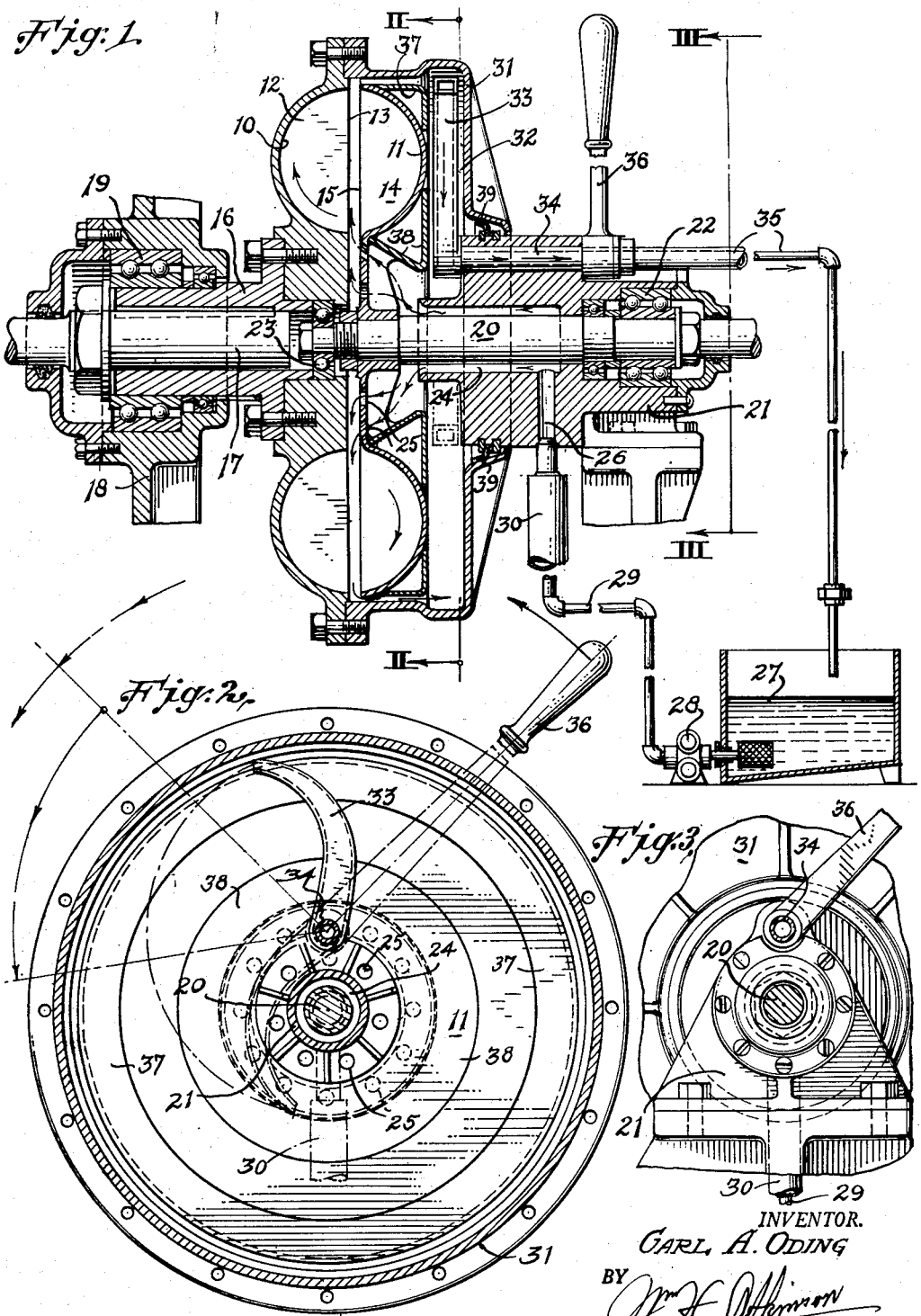
INVENTOR.
CARL A. ODING
BY
ATTORNEY.

Sept. 28, 1954  C. A. ODING  2,690,052
VARIABLE SPEED POWER TRANSMITTING FLUID COUPLING
Filed Nov. 22, 1949  3 Sheets-Sheet 2

INVENTOR.
CARL A. ODING.
BY
ATTORNEY.

Sept. 28, 1954  C. A. ODING  2,690,052
VARIABLE SPEED POWER TRANSMITTING FLUID COUPLING
Filed Nov. 22, 1949  3 Sheets-Sheet 3

INVENTOR
CARL A. ODING
BY
*Wm. H. Atkinson*
ATTORNEY

Patented Sept. 28, 1954

2,690,052

UNITED STATES PATENT OFFICE 2,690,052

VARIABLE SPEED POWER TRANSMITTING FLUID COUPLING

Carl A. Oding, Alameda, Calif., assignor, by direct and mesne assignments, to Planamatic Corporation, Oakland, Calif., a corporation of California Application November 22, 1949, Serial No. 128,717

4 Claims. (Cl. 60—54)

1

The present invention relates to fluid couplings of the vortex chamber type, and more particularly to a fluid coupling that is particularly suitable for stationary installations where the starting of heavy loads and/or the carrying of heavy loads at reduced speeds for long periods of time is required.

The main object of the present invention is to provide an improved speed controlling means for fluid couplings of the vortex chamber type that will permit the coupling to be operated for long periods of time as a speed reducing unit without objectionable overheating.

Another object of the invention is to provide a fluid controlling arrangement for a fluid coupling of the vortex chamber type in which a cooled operating fluid is circulated through the vortex chamber in a novel manner that will permit the coupling to operate as a speed reduction unit without overheating.

A further object of the invention is to provide a fluid coupling of the vortex chamber type in which a scoop is employed in conjunction with an independent source of fluid supply to maintain any desired level of operating fluid within the vortex chamber of the coupling independently of the rate of flow of operating fluid to the coupling.

Another object of the invention is to provide a fluid coupling of the vortex chamber type, in which a fluid discharging scoop is operated in direct communication with the vortex chamber of the coupling and without the interposition of any other fluid flow controlling means such as fixed or valved bleeder ports in the vortex chamber forming members of the coupling.

In the operation of fluid couplings of the character here contemplated where the coupling is required to operate under conditions of extreme slip the overheating of the operating fluid has presented a problem, and this is particularly true of couplings that are required to start heavy loads or operate under conditions where a wide difference in the speeds of the driving and driven members of the coupling occurs. It is therefore a further object of my invention to provide a fluid coupling of the vortex chamber type in which a uniform circulation of cooled operating fluid may be continuously introduced into the vortex chamber of the coupling at a constant rate and at the same time controlled in its discharge from the coupling in such a manner that different levels of operating fluid may be produced and maintained in the vortex chamber, sufficient to carry the load at the speed desired without

2 changing the rate at which the cooled operating fluid is introduced into the coupling.

Other objects and advantages of my invention will be in part apparent to those skilled in the art, and in part pointed out hereinafter in connection with the accompanying drawings wherein there is shown, by way of illustration and not of limitation preferred embodiments of the invention.

In the drawings:

Figure 1 is a vertical sectional view showing a fluid coupling constructed in accordance with the invention and employing a single scoop, Figure 2 is a vertical view taken along line II—II of Figure 1 looking in the direction of arrows, Figure 3 is a fragmentary end view of the coupling taken along line III—III of Figure 1 of the drawings, Figure 4 is a partial sectional view showing a modified form of the invention employing a double scoop arrangement suitable for use with a coupling of the type shown in Figure 1 of the drawings.

Figure 5:
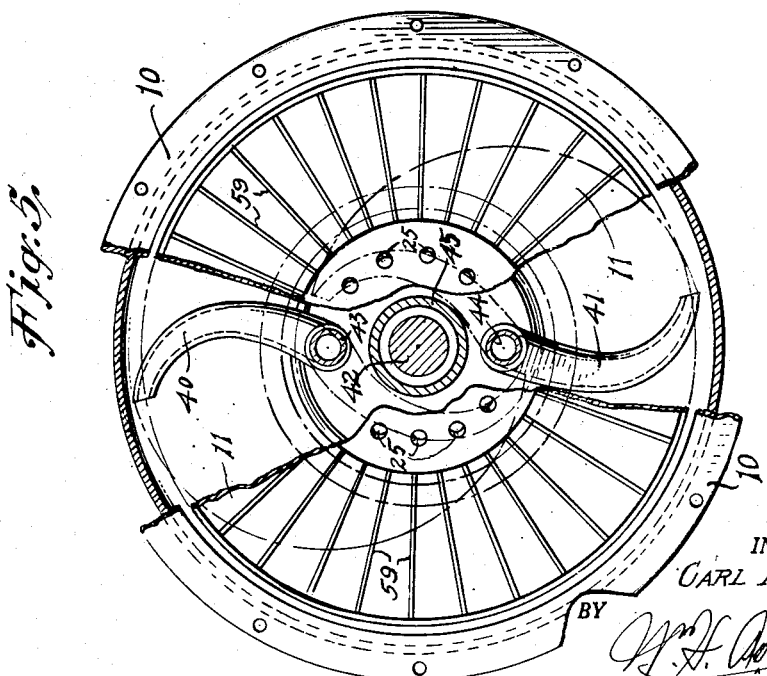
Figure 6:
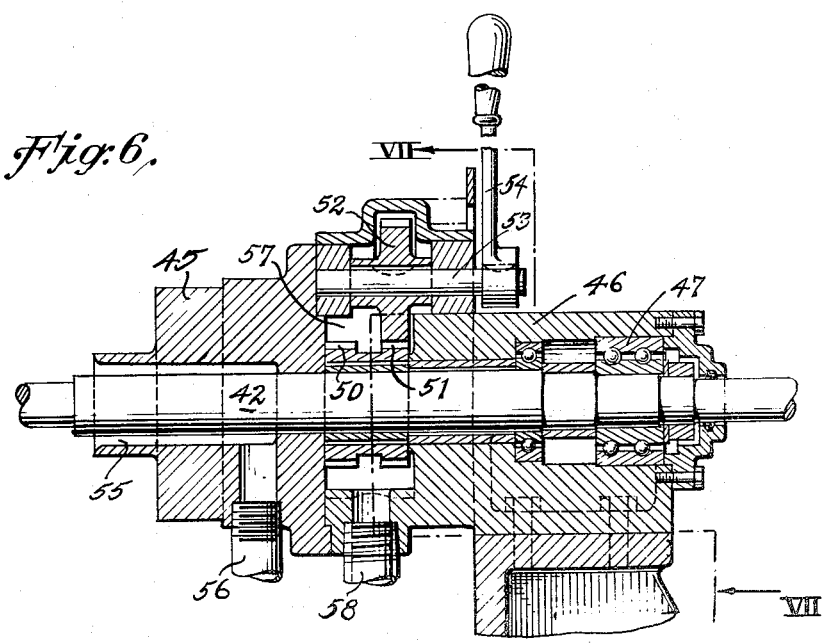
Figure 7:
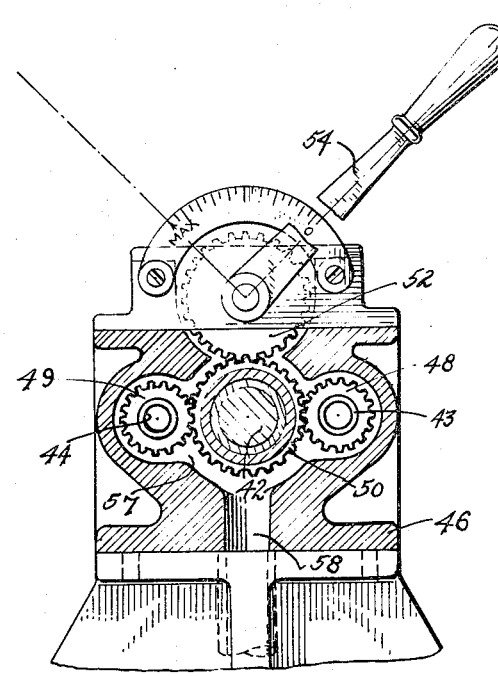

Figure 5 is an end view of the scoop arrangement shown in Figure 4 of the drawings, and partly in section on the line V—V, with parts broken away to show details of construction, Figure 6 is a partial sectional view taken in a plane at a right angle to the section shown in Figure 4 of the drawings, and Figure 7 is a sectional view taken along line VII—VII of Figure 6 of the drawings.

For a detailed description of the invention, reference is now made to the drawings, and particularly to Figures 1, 2 and 3, in which there is illustrated an embodiment of the invention employing a single scoop tube. In this particular showing the coupling has a driving member 10 and a driven member 11 of conventional form, such as are commonly used in fluid couplings of the type here under consideration. The driving member 10 is cupped in section to provide an annular chamber 12 in which radially extending vanes 13 are secured and the driven member 11 has a similar annular chamber 14 with spaced radially extending vanes 15 arranged therein. The driving member 10 is secured upon a hub 16 that is keyed to a driving shaft 17 which, together with the hub 16 is journaled upon a suitable support 18 by means of a bearing 19. In like manner the driven member 11 is secured upon the inner end of a shaft 20 that is journaled at its outer end upon a suitable support 21 by means of a bearing 22. At its inner end the driven shaft 20 is also journaled in a pilot bearing 23 that is positioned within a hub portion of the driving member 10. In this particular instance the support 21 upon which the driven shaft 20 is journaled has a coaxially extending chamber that forms an annular fluid passageway 24 around the driven shaft 20 and through which fluid may be introduced into the vortex chamber formed between the opposed driving and driven members 10 and 11. In this connection it will be noted that the hub portion of the driven member 11 is shown as having fluid ports 25 through which fluid may enter from the annular passageway 24 and into the space between the driving and driven members 10 and 11 and thence to the vortex chamber formed therebetween. At its outer end the annular passageway 24 is shown as connecting with inlet conduit 26 through which fluid may be circulated from a source of supply 27 by means of an independently operating pump 28. In this particular instance the pump 28 is shown as connected to the conduit 26, by means of a pipe line 29 which includes a fluid cooling unit 30 that may be of any desired design and capacity. At its outer periphery the driving member 10 is shown as extended to form a shroud or chamber forming member 31 that will in conjunction with the driven member 11 form a fluid accommodating chamber 32. At this point it will be noted by reference to the drawings that the shroud or chamber forming member 31 carried by the driving member 10 is spaced outward from the perimeter of the driven member 11. This provides an unrestricted passageway through which the operating fluid can freely flow from the vortex chamber and into the fluid accommodating chamber 32 within which the scoop tube 33 operates. The applicant avoids the use of bleed-off nozzles or restricted ports such as are now generally employed in couplings of the prior art for retaining and/or preventing too rapid a discharge of fluid from the vortex chamber. In the applicant's arrangement instead of relying upon restricted nozzles or ports, the applicant depends upon a fluid balance which results from the accumulation of fluid in the fluid accommodating chamber. Therefore while maintaining at all times a constant flow of operating fluid through the vortex chamber the applicant is able by positioning his scoop tube 33 at various positions to maintain any desired effective working level of fluid within the vortex chamber of the coupling. This fluid accommodating chamber 32 is in direct communication with the vortex chamber of the coupling and disposed therein is an adjustable scoop tube 33 by which fluid may be extracted therefrom as will hereinafter appear. The scoop tube 33 is journaled upon an eccentrically disposed tubular shaft 34 that forms a passageway from the interior of the scoop tube 33 to a pipe line 35 through which the fluid thus extracted from the fluid accommodating chamber 32 is returned to the source of fluid supply 27, for cooling and recirculation through the coupling.

In order to restrict the volumetric capacity of the fluid accommodating chamber 32 the driven member 11 is shown as built out with bent sheet metal members 37 and 38 so as to form a substantially flat annular wall for this side of the fluid accommodating chamber 32 and adjacent which the scoop tube 33 will operate. At the other side of the scoop tube 33 the chamber forming member 31 is extended inwardly to a point corresponding substantially to the inner periphery of the vortex chamber. With this arrangement and under normal operating conditions it is contemplated that the centrifugal level of fluid maintained within the fluid accommodating chamber 32 will be limited by the scoop tube 33 to a point inwardly from the inner radial limits of the vortex chamber and therefore the danger of fluid escaping while the coupling is in operation is avoided. However, as a prevention against a possible leakage of fluid by seepage or creeping when the coupling is not in use, there is a sealing means 39 between the overhanging portion of the chamber forming member 31 and the support 21 upon which the driven shaft 20 is journaled. It is to be understood that this packing or sealing means 39 may take any conventional form, for example, a simple labyrinth packing without contact between the parts may be employed.

While others have proposed the use of a scoop tube for extracting an operating fluid forming an auxiliary fluid collecting chamber mounted adjacent and rotatable with the vortex chamber of a coupling, it is believed that the present invention is the first instance wherein the use of a scooping means such as the scoop tube 33 has been employed without resort to restricted passageways or bleed-off ports as a means for maintaining a desired centrifugal level of operating fluid within the vortex chamber of a coupling and this with a constant uniform flow of operating fluid from a separate source of supply. In all of the prior art arrangements restricted clearances and small bleeder ports have been employed to restrict the flow of fluid from the vortex chamber and it has been only after the flow of fluid has been thus retarded that the prior art scooping means has come into operation, whereas in the applicant's arrangement a free circulation of fluid, through the vortex chamber of the coupling is deliberately provided for, while at the same time a level of working fluid is established in the vortex chamber by maintaining a centrifugal level of fluid in the fluid accommodating chamber 32 that will produce a fluid balance against the escape of fluid from the vortex chamber which can be changed, while the coupling is in operation, by an adjustment of the scoop tube 33. In this manner any desired speed differential may be established between the driving and driven members 10 and 11 of the coupling. Another and important advantage of the arrangement here proposed is that with a constant flow of fluid to the coupling, the scoop tube 33 can be operated to provide for a quick coupling and uncoupling action between the driving and driven shafts 17 and 20. Under normal operating conditions it is intended that the scoop tube 33 will be of such size and shape that its open end will engage the fluid in the fluid accommodating chamber in a partially submerged or skimming manner rather than becoming completely submerged at its outer end. This will greatly reduce the losses which are inherent in the use of such a scooping means and to this end it is conceivable that the scoop tube may be of rectangular cross-section with its longest dimension extending in the plane of its movement. While the scoop tube 33 will operate with almost any receding curvature it has been found that an irregular curvature which increases at a uniform rate as the outer end scoop tube is approached will give the smoothest operating results.

Reference is now made to the remaining figures of the drawings for a description of a fluid coupling of the character above described in which two scoop tubes are arranged in oppositely disposed positions about the axis of the coupling and controlled so as to operate in unison with a single operating lever or other controlling means. In these latter figures of the drawings, the two scoops designated by the numerals 40 and 41 are arranged on opposite sides of a driven shaft 42 and are respectively carried by tubular supporting shafts 43 and 44 which are journaled in a casting 45 that is secured to a support 46 and the shaft 42 is journaled upon the support 46 by means of a bearing 47. In this showing, the tubular shafts 43 and 44 are disposed in a horizontal plane at opposite sides of the driven shaft 42. These shafts 43 and 44 respectively carry spur gears 48 and 49 that mesh with a gear 50 which is formed integral with a gear 51 which meshes as is more clearly shown in Figure 6 of the drawings with an operating gear 52. This operating gear 52 is keyed upon a shaft 53 which is adapted to be rocked by a manually controlled lever 54. While the lever 54 is here shown as of the manually operated type, it will be understood that this lever 54 may be automatically controlled by other means if desired. The casting 45 is also shown as cored out to provide an annular passageway 55 through which fluid entering through an input pipe 56 will be directed to the interior of the vortex chamber in the manner hereinbefore described. At their outer ends beyond the gears 48 and 49 the tubular shafts 43 and 44 open into a cavity 57 from which the scooped oil passing through the tubular shafts 43 and 44 is directed to a discharge pipe 58 that leads back to the source of fluid supply for recirculation through the coupling. With this arrangement it will be seen that the scooping action is multiplied two-fold and therefore the control of the coupling is extremely sensitive. A further advantage in the multiple scoop arrangement is that the surging action of the fluid such as occurs where a single scoop is employed is greatly reduced. This surging action is believed to be due to an unbalance in the fluid which results when the scooping occurs at only one point about the periphery of the coupling. In addition to showing the disposition and character of the scoops, Figure 5 also shows the coupling member 11 as having radially extending partitions 59 between which the operating fluid circulates as a vortex chamber when coupling is in operation.

While the use of scoop tubes in conjunction with fluid couplings of the vortex chamber type have been long in use, their function so far as has been determined is to insure an efficient operation of the coupling at its normal full load rating and under these conditions the scooping means has been used to conduct fluid from the coupling members at a rate which has been determined by the employment of various forms of valved passageways and/or bleeder ports which function to retard the escape of fluid from the vortex chamber. Under these conditions the scoop tube has operated merely to remove the fluid which has leaked from the vortex chamber. In no instance does the prior art provide an arrangement wherein a coupling of this type is used with a separate and independent source of operating fluid from which the operating fluid is intentionally directed into and out of the vortex chamber of the coupling at a uniform rate irrespective of the speed at which the coupling operates. In the present invention the coupling operates with a constant and uniform flow of operating fluid and through the vortex chamber and to this end the scooping means is proportioned so that it is capable of scooping the operating fluid from the fluid accommodating chamber of the coupling at a rate at least equal to the rate at which the fluid is introduced thereto. When the coupling is operating as a speed reducing unit the scoops will be adjusted so as to maintain just the proper amount or level of circulating fluid in the vortex chamber which will drive the load at the speed desired. This will vary with the load and therefore it will be seen that by a proper setting of the scoop tube 33 or the scoop tubes 40 and 41 it will be possible to operate the coupling as a speed reducing unit. In other words the coupling will operate with any degree of slip between the cooperating vortex chamber forming members without excessive overheating of the fluid or the coupling members through which the fluid circulates. When scoop tubes are provided of a size capable of carrying away the fluid faster than it is introduced into the coupling, a setting of the scoop at any one position will determine the amount of fluid which will remain in the coupling, and this irrespective of the rate at which the cooled recirculating fluid is introduced into the vortex chamber. From this it will be readily seen that the present invention provides an arrangement that is capable of satisfying many industrial needs which cannot be satisfied with couplings of present day types in which the circulation of operating fluid is dependent upon restricted leakage between the vortex chamber forming member.

While I have, for the sake of clearness and in order to disclose the invention so that the same can be readily understood, described and illustrated specific forms and arrangements, it is to be understood that the invention is not limited to specfiic forms disclosed, but may be embodied in other forms that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a speed controlling fluid coupling of the vortex chamber type, the combination of a driving member, a driven member arranged in space coaxial relation with said driving member and forming a vortex chamber within which a kinetic energy transmitting fluid may circulate as a vortex, means carried by and rotatable with said driving member forming a coaxially disposed fluid accumulating chamber externally of said driven member, said driving and driven members being spaced at their outer perimeters to permit escape of fluid therefrom directly into said fluid accumulating chamber, a fluid supply means operating independently of said coupling for introducing a uniform flow of fluid into the vortex chamber formed between said driving and driven members, a pair of oppositely disposed scoop tubes mounted eccentrically one on each side of the axis of said coupling and extending into said fluid accumulating chamber, said scoop tubes being adapted and arranged to scoop fluid at diametrical opposite points from said fluid accumulating chamber and at corresponding radial points and at a rate equal to the rate at which fluid is introduced into said vortex chamber, and means for simultaneously adjusting the extension of said scoop tubes in said fluid accumulating chamber, whereby any desired reduction in speed may be obtained between said driving and driven members while maintaining a constant flow operation fluid through the vortex chamber of the coupling.

2. In a speed controlling fluid coupling of the vortex chamber type, the combination of a driving member, a driven member arranged in space coaxial relation with said driving member and forming a vortex chamber in which a kinetic energy transmitting fluid may circulate as a vortex, means carried by and rotatable with said driving member forming a coaxially disposed fluid accommodating enclosure about said driven member, said driving and driven members being spaced at their outer perimeters to permit the free escape of fluid therefrom and directly into said fluid enclosure, means operating independently of said driving and driven members for maintaining continuous uniform flow of operating fluid through the vortex chamber formed between said driving and driven members, an adjustable scoop tube mounted eccentrically with respect to the axis of said coupling and disposed in said fluid accommodating chamber, a second adjustable scoop tube mounted eccentrically to the axis and diametrically opposite said first scoop tube, and means for simultaneously adjusting said scoop tubes to corresponding radial positions within said enclosure to scoop fluid therefrom at a rate corresponding to the rate at which fluid is introduced to said vortex chamber.

3. In a fluid coupling of the vortex chamber type, the combination of a driving member, a driven member arranged in space coaxial relation with said driving member and forming a vortex chamber in which a kinetic energy transmitting fluid may circulate, a chamber forming member carried by said driving member and extending over said driven member to form a coaxially disposed fluid accommodating chamber, said fluid accommodating chamber being in direct and completely annular communication with said vortex chamber, a fluid delivery means for introducing operating fluid into the vortex chamber formed between said driving and driven members, a pair of tubular shafts mounted eccentrically one on each side of and extending parallel to the axis of said coupling, a radially extending scoop tube mounted radially as a tubular extension upon the inner end of each of said tubular shafts arranged to scoop fluid from diametrically opposite points within said fluid accommodating chamber and discharge it through said tubular shafts, a fluid circulating connection between the outer end of each of said scoop tubes and said fluid delivery means, a spur gear carried by and keyed upon each of said tubular shafts, a single control gear in mesh with the spur gears upon said tubular shafts, means for turning said control gear to produce a corresponding rotation of each of said tubular shafts, whereby the position of the scoops within said fluid accommodating chamber will be simultaneously changed in the same degree with each operating movement of said control gear.

4. In a speed controlling fluid coupling of the vortex chamber type, the combination of a driving member, a driven member arranged in space coaxial relation with said driving member and forming a vortex chamber in which a kinetic energy transmitting fluid may circulate as a vortex, means carried by and rotatable with said driving member forming a coaxially disposed fluid accommodating chamber externally of said vortex chamber, said driven member being spaced from said means at its outer perimeter to permit the escape of fluid from said vortex chamber directly into said fluid accommodating chamber, means for supplying a uniform flow of operating fluid to the vortex chamber formed between said driving and driven members, a coaxially extending driven shaft upon which said driven member is mounted, a bearing support for said driven shaft, a pair of rotatably mounted tubular shafts journaled upon said bearing support and extending in parallel relation along opposite sides of said driven shaft, a scoop tube mounted upon one end of each of said tubular shafts and extending radially within said fluid accommodating chamber to scoop fluid therefrom at diametrically opposite points and discharge said fluid through said tubular shafts, said scoop tubes having a capacity at least equal to maximum uniform flow of fluid from said supply means, a fluid conducting conduit extending from each of said scoop tubes to said fluid flow maintaining means, a spur gear keyed to the other end of each of said tubular shafts, an operating gear disposed between said spur gears and rotatable about the axis of said driven shaft, and means for imparting rotation to said operating gear, whereby said spur gears will be simultaneously operated to vary the positions of the intake ends of said scoop tubes within said fluid accommodating chamber.

References Cited in the file of this patent

UNITED STATES PATENTS

| Number | Name | Date |
|---|---|---|
| 2,187,656 | Kiep et al. | Jan. 16, 1940 |
| 2,264,341 | Sinclair | Dec. 2, 1941 |
| 2,299,049 | Ziebolz | Oct. 13, 1942 |
| 2,508,442 | Becker | May 23, 1950 |
| 2,557,894 | Siesel | June 19, 1951 |